(12) United States Patent
Yoneyama

(10) Patent No.: US 11,654,571 B2
(45) Date of Patent: May 23, 2023

(54) THREE-DIMENSIONAL DATA GENERATION DEVICE AND ROBOT CONTROL SYSTEM

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 291 days.

(21) Appl. No.: 16/920,755

(22) Filed: Jul. 6, 2020

(65) Prior Publication Data

US 2021/0023718 A1    Jan. 28, 2021

(30) Foreign Application Priority Data

Jul. 22, 2019    (JP) .............................. JP2019-134552

(51) Int. Cl.
     *B25J 9/16*           (2006.01)
     *B25J 13/08*         (2006.01)
                 (Continued)

(52) U.S. Cl.
     CPC ............ *B25J 9/1697* (2013.01); *B25J 9/1664* (2013.01); *B25J 13/08* (2013.01); *G06T 7/70* (2017.01);
                 (Continued)

(58) Field of Classification Search
     CPC ........ B25J 9/1697; B25J 9/1664; B25J 13/08; B25J 9/1671; B25J 9/161; B25J 9/1612;
                 (Continued)

(56) References Cited

U.S. PATENT DOCUMENTS 6,259,815 B1 * 7/2001 Anderson ............ G06V 10/754
                                                    382/218
9,715,761 B2 * 7/2017 Lee .......................... G06T 7/55
                   (Continued)

FOREIGN PATENT DOCUMENTS

JP      2004295223 A    10/2004
JP      2009-175954 A    8/2009
                 (Continued)

OTHER PUBLICATIONS

Aleotti, J., Lodi Rizzini, D. & Caselli, S., Perception and Grasping of Object Parts from Active Robot Exploration, 2014, Springer Science, Journal of Intelligent & Robotic Systems, vol. 76 (2014), pp. 401-425, DOI 10.1007/s10846-014-0045-6 (Year: 2014).*

(Continued)

*Primary Examiner* — Jaime Figueroa
(74) *Attorney, Agent, or Firm* — Hauptman Ham, LLP

(57) ABSTRACT

A three-dimensional data generation device includes a virtual space arrangement section for arranging a virtual workpiece and a virtual vision sensor in a virtual space so that a part of the virtual workpiece fits in an imaging range of the virtual vision sensor, an arrangement relationship calculation section for calculating an arrangement relation between the arranged virtual workpiece and the virtual vision sensor, and a partial three-dimensional data generation section for generating partial three-dimensional data representing a partial shape of a workpiece which fits in the imaging range based on the calculated arrangement relationship.

19 Claims, 6 Drawing Sheets

(51) Int. Cl.
  *G06T 17/00*   (2006.01)
  *G06T 7/70*    (2017.01)
(52) U.S. Cl.
  CPC .... *G06T 17/00* (2013.01); *G06T 2207/30164* (2013.01)
(58) Field of Classification Search
  CPC . G06T 7/70; G06T 17/00; G06T 2207/30164; G05B 19/042
  USPC ................ 700/245–264; 318/568.11–568.25
  See application file for complete search history.

(56) References Cited

U.S. PATENT DOCUMENTS

| | | | | |
|---|---|---|---|---|
| 9,972,120 | B2* | 5/2018 | Sweet | G06T 17/00 |
| 10,074,160 | B2* | 9/2018 | Kim | G06T 15/06 |
| 10,204,448 | B2* | 2/2019 | Hazeghi | H04N 13/243 |
| 10,319,080 | B2* | 6/2019 | Kim | G06T 5/002 |
| 10,394,327 | B2* | 8/2019 | Chizeck | G06F 3/016 |
| 10,521,914 | B2* | 12/2019 | Lam | G06T 7/12 |
| 10,650,588 | B2* | 5/2020 | Hazeghi | H04N 23/12 |
| 10,796,403 | B2* | 10/2020 | Choi | G06V 40/172 |
| 2005/0068317 | A1* | 3/2005 | Amakai | G06T 7/0012 |
| | | | | 345/419 |
| 2005/0253924 | A1* | 11/2005 | Mashitani | H04N 13/275 |
| | | | | 348/42 |
| 2010/0209013 | A1* | 8/2010 | Minear | G06T 7/32 |
| | | | | 382/294 |
| 2010/0310154 | A1* | 12/2010 | Barrois | G01B 11/245 |
| | | | | 382/154 |
| 2012/0063672 | A1* | 3/2012 | Gordon | G06T 7/521 |
| | | | | 382/154 |
| 2012/0121132 | A1* | 5/2012 | Asahara | G06V 20/64 |
| | | | | 901/1 |
| 2013/0249901 | A1* | 9/2013 | Sweet | G06T 15/04 |
| | | | | 345/419 |
| 2015/0009214 | A1* | 1/2015 | Lee | G06T 17/10 |
| | | | | 345/420 |
| 2015/0062120 | A1* | 3/2015 | Reisner-Kollmann | |
| | | | | G06T 19/006 |
| | | | | 345/419 |
| 2017/0348854 | A1* | 12/2017 | Oleynik | A47B 77/08 |
| 2018/0130255 | A1* | 5/2018 | Hazeghi | H04N 23/51 |
| 2019/0019030 | A1* | 1/2019 | Cansizoglu | G06T 7/75 |
| 2019/0096135 | A1* | 3/2019 | Dal Mutto | G06T 7/0006 |
| 2019/0108678 | A1* | 4/2019 | Hazeghi | H04N 13/254 |
| 2020/0371494 | A1* | 11/2020 | Warner | G06V 20/653 |

FOREIGN PATENT DOCUMENTS

| | | |
|---|---|---|
| JP | 201089238 A | 4/2010 |
| JP | 2010184308 A | 8/2010 |
| JP | 2010211746 A | 9/2010 |
| JP | 2014-184543 A | 10/2014 |
| JP | 2015-136770 A | 7/2015 |
| JP | 2016179534 A | 10/2016 |
| JP | 2018144167 A | 9/2018 |

OTHER PUBLICATIONS

Goldfeder et al, Data-Driven Grasping with Partial Sensor Data, 2009, IEEE, The 2009 IEEE/RSJ International Conference on Intelligent Robots and Systems, Oct. 11-15, 2009 St. Louis, USA, pp. 1278-1283, 978-1-4244-3804-4/09 (Year: 2009).*

Skotheim et al, A Flexible 3D Object Localization System for Industrial Part Handling, 2012, IEEE, 2012 IEEE/RSJ International Conference on Intelligent Robots and Systems, Oct. 7-12, 2012. Vilamoura, Algarve, Portugal, pp. 3326-3333 (Year: 2012).*

* cited by examiner

THREE-DIMENSIONAL DATA GENERATION DEVICE AND ROBOT CONTROL SYSTEM

RELATED APPLICATIONS

The present application claims priority to Japanese Application Number 2019-134552, filed Jul. 22, 2019, the disclosure of which is hereby incorporated by reference herein in its entirety.

BACKGROUND OF THE INVENTION

1. Field of the Invention

The present invention relates to a three-dimensional data generation device and a robot control system, and in particular, relates to a three-dimensional data generation device and a robot control system for the offline generation of partial three-dimensional data of a workpiece as master data for workpiece detection in robot vision.

2. Description of the Related Art

In robot vision used for industrial robot control, by detecting a workpiece from data acquired with a vision scanner, at least one of the position and posture of the robot taught in advance is corrected, or at least one of the position and posture of the robot is directly taught. Pattern matching is widely used as a workpiece detection method, and in pattern matching, a two-dimensional pattern or a three-dimensional pattern is used as the master data for workpiece detection. Three-dimensional patterns are superior to two-dimensional patterns in that three-dimensional patterns can be used to detect workpieces robustly with respect to changes in the brightness value as well as rotational and scale changes of the workpieces.

As the three-dimensional pattern, in addition to full three-dimensional data representing the entire shape of the workpiece, partial three-dimensional data representing the partial shape of the workpiece is used. The partial three-dimensional data not only enables high-speed matching processing, but also is used to realize high-precision matching processing even in situations in which workpieces overlap each other, such as bulk picking, which has been performed in recent years. As technologies related to the present invention, the following documents are known.

Japanese Unexamined Patent Publication (Kokai) No. 2004-295223 describes that by performing pattern matching using a transformed model pattern which is obtained by a geometric transformation of a taught model pattern, in addition to parallel movement, rotational movement, and scaling, objects with three-dimensionally different relative postures can be recognized.

Japanese Unexamined Patent Publication (Kokai) No. 2010-89238 describes that when picking workpieces one-by-one from a plurality of bulk stacked workpieces with a robot, by storing the typical partial shape of the workpieces and the priority of the gripping position suitable for this partial shape, the gripping positions of the bulk workpieces can be determined in a short time and workpieces can be quickly picked. Furthermore, it is described that by selecting a high-priority gripping position, interference between the workpiece to be picked and other workpieces can be prevented.

Japanese Unexamined Patent Publication (Kokai) No. 2010-184308 describes that by detecting a workpiece using a part of a workpiece as a shape model without registering the entire workpiece as a shape model, detection image processing time can be reduced and the position and posture of the workpiece can be determined.

Japanese Unexamined Patent Publication (Kokai) No. 2010-211746 describes that in order to easily check whether set contents of a 3D vision sensor, such as a stereo camera, are appropriate, three-dimensional information of at least a part of the edges of a recognition target acquired by an imaging unit and a three-dimensional model representing the entire recognition target are perspective-transformed to the coordinate system of the imaging unit, and the projected image of the edges of the recognition target subjected to perspective-transformation and the projected image of the three-dimensional model are displayed in a correlatable manner.

Japanese Unexamined Patent Publication (Kokai) No. 2016-179534 describes that distance information for a plurality of stacked objects is acquired, the position and posture of a measurement target object is derived based on the distance information and a partial model representing a partial shape of the object, and it is determined whether interference will occur between the measurement target object and the container in which the measurement target object is stored based on a full model representing the entire shape of the object.

Japanese Unexamined Patent Publication (Kokai) No. 2018-144167 describes that in bulk picking using robot vision, three-dimensional searching using a plurality of search models is performed to specify the position and posture of each workpiece from an input image, in addition to the position and posture of the workpiece surface corresponding to the search model that succeeded in the 3D search, the position and posture of the workpiece surface corresponding to the search model in which the 3D search failed or the search model for which the search reliability is low is specified and is made available as a candidate gripping position.

SUMMARY OF THE INVENTION

Three-dimensional data of a workpiece to be registered as master data for workpiece detection is taught to a robot online or offline. In the case of online teaching, though an actual robot, which is an actual machine, an actual vision sensor, and an actual workpiece are prepared and three-dimensional data of the workpiece is generated, it is not possible to accurately generate three-dimensional data of a workpiece in some cases due to the effects of glossiness of the workpiece, illumination, and external light. Thus, there is a problem in that trial and error of the teacher is required and man-hours are required.

Conversely, in the case of offline teaching, generally, CAD (computer-aided design) data of a workpiece is prepared, and master data for workpiece detection is generated from the CAD data in the software, whereby teacher operations are reduced. However, the full three-dimensional data representing the entire shape of the workpiece not only slows down the matching process, but may not be applicable to some applications, such as bulk picking. Furthermore, even in the case of partial three-dimensional data representing a partial shape of the workpiece, if the vision sensor has a wide imaging range relative to the size of the partial three-dimensional data, time is required for the matching process.

Thus, there is a need for a technology for providing master data for workpiece detection with which the number of steps for creating master data for workpiece detection is reduced and with which a high-speed matching processing can be realized.

An aspect of the present disclosure provides a three-dimensional data generation device comprising a virtual space arrangement section for arranging a virtual workpiece and a virtual vision sensor in a virtual space so that a part of the virtual workpiece fits in an imaging range of the virtual vision sensor, an arrangement relationship calculation section for calculating an arrangement relation between the arranged virtual workpiece and the virtual vision sensor, and a partial three-dimensional data generation section for generating partial three-dimensional data representing a partial shape of a workpiece which fits in the imaging range based on the calculated arrangement relationship.

DETAILED DESCRIPTION

Figure 1:
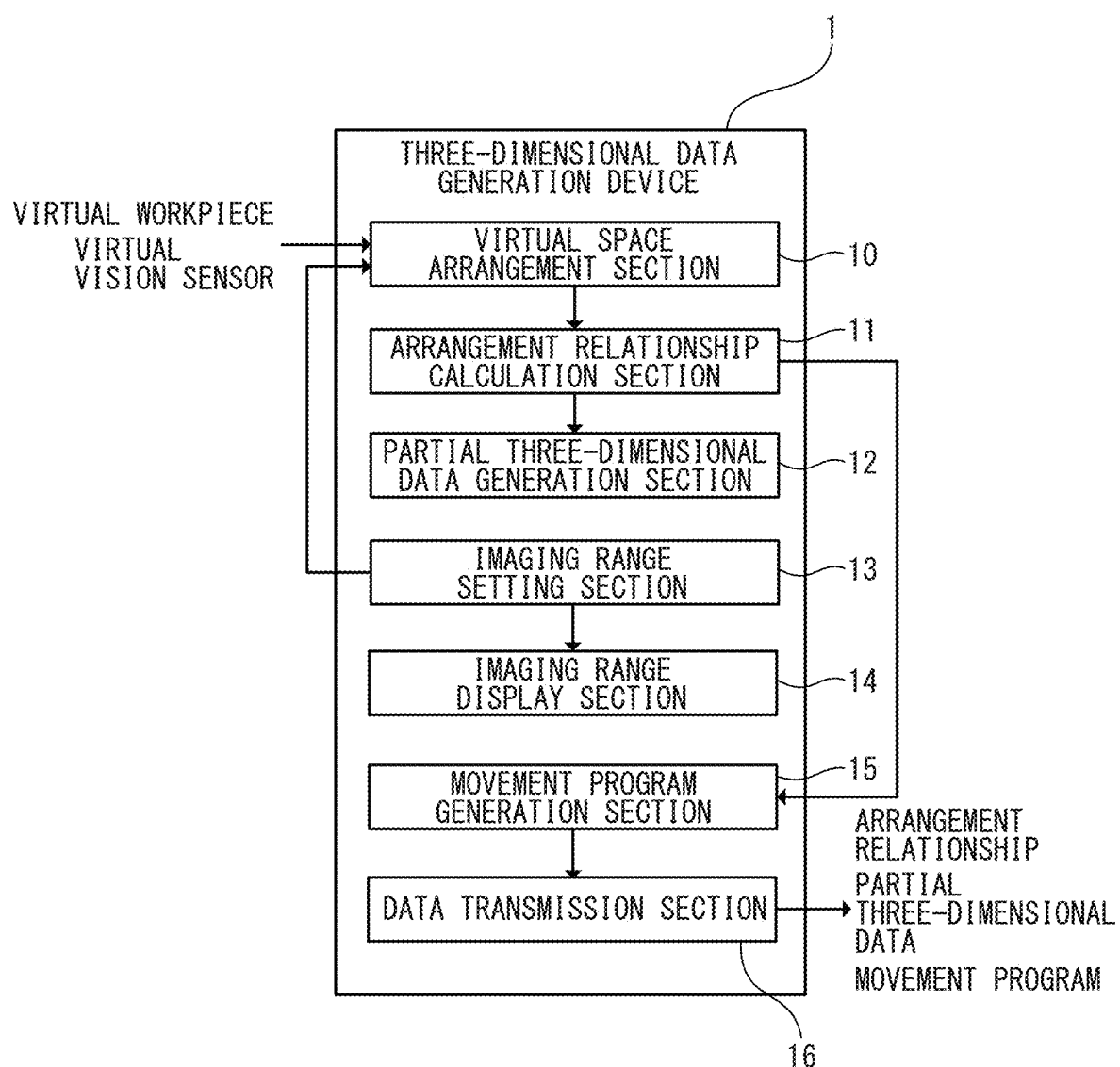
FIG. 1 is a structural view of a three-dimensional data generation device according to an embodiment.

The embodiments of the present disclosure will be described in detail below with reference to the attached drawings. In the drawings, identical or corresponding constituent elements have been assigned the same or corresponding reference signs. Furthermore, the embodiments described below do not limit the technical scope of the invention or the definitions of the terms described in the claims. Note that in this document, the simple terms "workpiece", "vision sensor", and "robot" encompass the respective terms "virtual workpiece" and "actual workpiece", "virtual vision sensor" and "actual vision sensor", and "virtual robot" and "actual robot."Furthermore, as used herein, "three-dimensional model" means three-dimensional data including at least surface information of an object, "three-dimensional edges" means three-dimensional data which does not include surface information of the object but which includes at least edge information of the object, and "three-dimensional point cloud data" means data which does not include surface information or edge information of the object but which includes at least point information of the object.

FIG. 1 shows the configuration of a three-dimensional data generation device 1 according to the present embodiment. The three-dimensional data generation device 1 is constituted by a known computing device comprising a processor such as a CPU (central processing unit) or FPGA (field-programmable gate array). Though the three-dimensional data generation device 1 is an offline teaching device different from a robot control device (not illustrated), it may be integral with the robot control device. Furthermore, though the three-dimensional data generation device 1 is configured to be capable of communicating with the robot control device via a cable or wirelessly in order to pass the generated data to the robot control device, it may pass the data to the robot control device via an external memory. Note that the "section" constituent elements of the three-dimensional data generation device 1 shown in FIG. 1 represent functional blocks or functional sections.

The three-dimensional data generation device 1 comprises a virtual space arrangement section 10, an arrangement relationship calculation section 11, and a partial three-dimensional data generation section 12. The virtual space arrangement section 10 reads the full three-dimensional data representing the overall shape of the virtual workpiece, the virtual vision sensor, and the virtual robot from the memory, and arranges them in the virtual space. A three-dimensional model, three-dimensional edges, or three-dimensional point cloud data may be used as the full three-dimensional data. The three-dimensional model may be, for example, CAD data or polygon data, the three-dimensional edges may be, for example, wireframe data, and the three-dimensional point cloud data may be, for example, point cloud data generated by a TOF (time of flight) camera or a laser scanner.

Figure 2A:
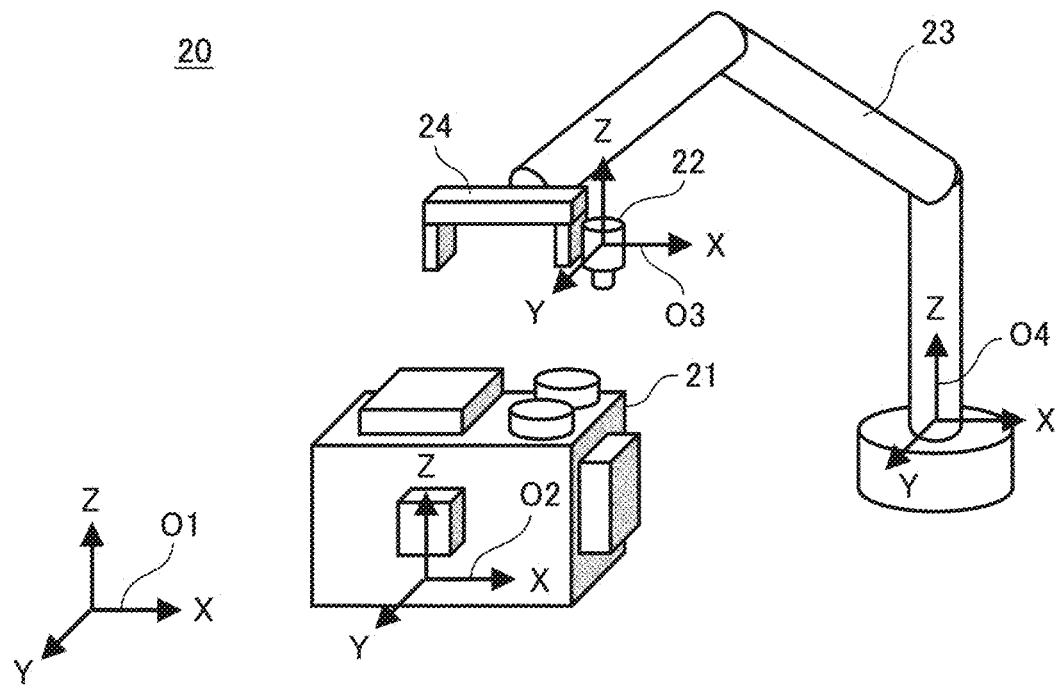
FIG. 2A is a perspective view showing an example of the arrangement of a virtual workpiece, a virtual vision sensor, and a virtual robot.
Figure 2B:
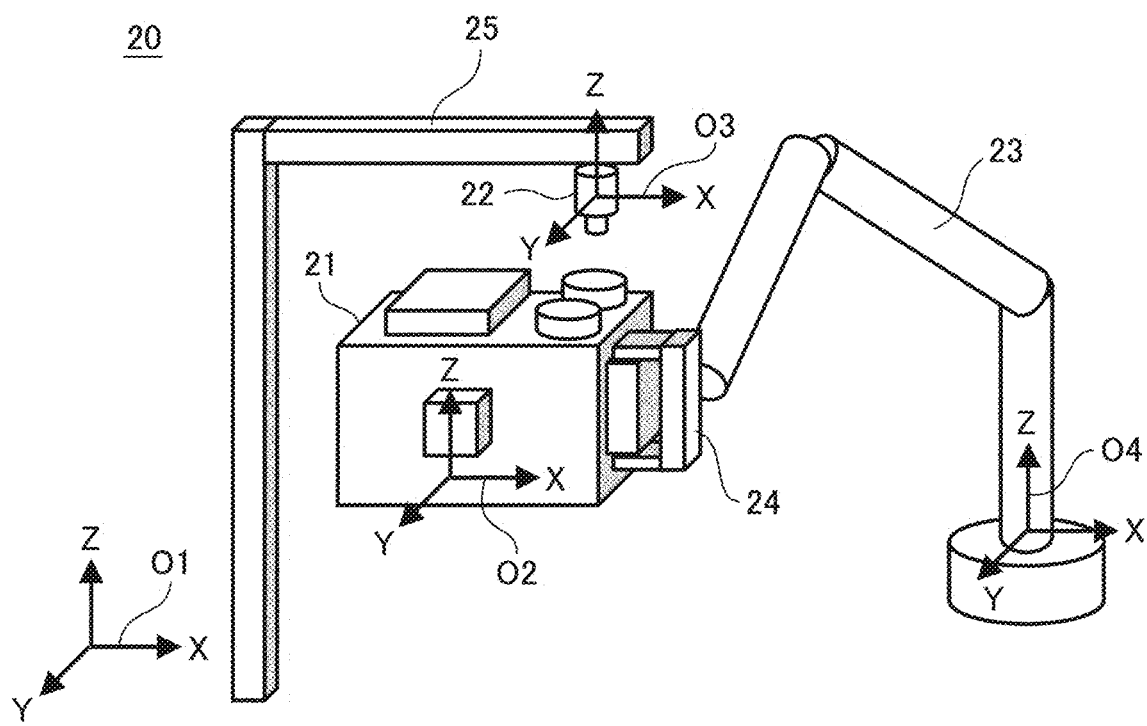
FIG. 2B is a perspective view showing an example of the arrangement of a virtual workpiece, a virtual vision sensor, and a virtual robot.

FIGS. 2A and 2B show examples of the arrangement of the virtual workpiece 21, the virtual vision sensor 22, and the virtual robot 23. The virtual space arrangement section 10 arranges the virtual workpiece 21 and the virtual vision sensor 22 in the virtual space 20 so that a part of the virtual workpiece 21 fits in the imaging range of the virtual vision sensor 22. Note that in the example shown in FIG. 2A, the virtual vision sensor 22 is arranged near an end effector of the virtual robot 23, for example, the hand 24, whereas in the example shown in FIG. 2B, the virtual vision sensor 22 is affixed to a portion separate from the virtual robot 23, for example, to an affixation structure 25. The virtual vision sensor 22 may be a two-dimensional sensor or may be a three-dimensional sensor. The two-dimensional sensor may be, for example, a CCD (charge-coupled device) camera, a CMOS (complementary metal-oxide semiconductor) camera, or the like, and the three-dimensional sensor may be, for example, a stereo camera, a TOF camera, a laser scanner, or the like. The origin O1 of the virtual space 20, the origin O2 of the virtual workpiece 21, the original O3 of the virtual vision sensor 22, and the origin O4 of the virtual robot 23 are set in the virtual space 20, and the three-dimensional data is configured to be coordinate-transformed between the respective orthogonal coordinate systems centered on the origins O1 to O4.

Referring again to FIG. 1, the arrangement relationship calculation section 11 calculates the arrangement relationship between the arranged virtual workpiece 21 and virtual vision sensor 22. The arrangement relationship may be, for example, at least one of the position and posture of the virtual workpiece 21 with respect to at least one of the position and posture of the virtual vision sensor 22, or may be at least one of the position and posture of the virtual vision sensor 22 with respect to at least one of the position and posture of the virtual workpiece 21.

Figure 3:
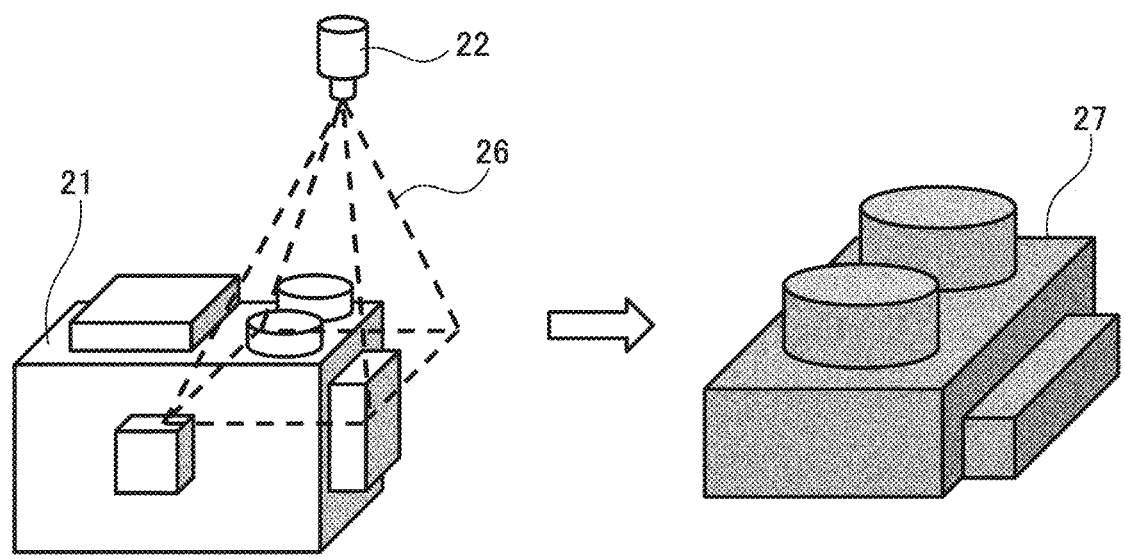
FIG. 3 is a perspective view showing an example of partial three-dimensional data generation.
Figure 4:
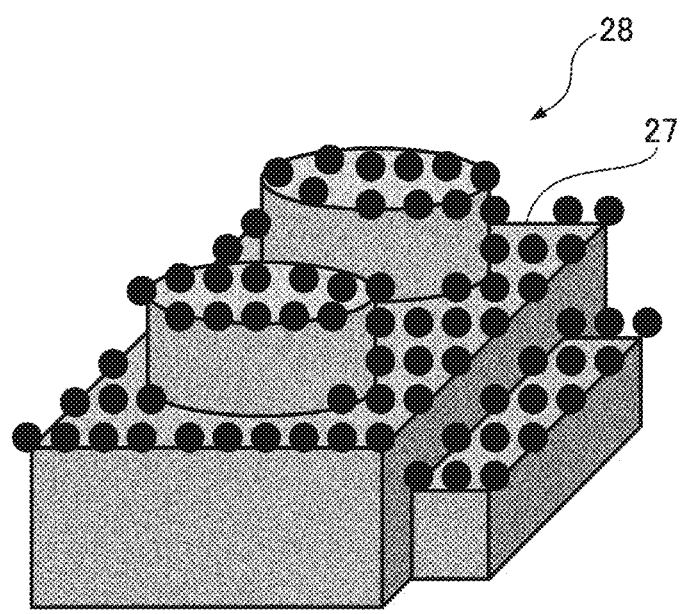
FIG. 4 is a perspective view showing an example of partial three-dimensional data generation.

The partial three-dimensional data generation section 12 generates the partial three-dimensional data of the workpiece which fits in the imaging range of the virtual vision sensor 22 based on the calculated arrangement relationship. FIGS. 3 and 4 show generation examples of the partial three-dimensional data 28. The imaging range 26 may be a three-dimensional model prepared in advance, and in the example shown in FIG. 3, the imaging range 26 has a rectangular pyramid shape. When the virtual workpiece 21 is, for example, a three-dimensional model, the intersection line between each surface of the three-dimensional model of the imaging range 26 and each surface of the three-dimensional model of the virtual workpiece 21 is determined, a partial three-dimensional model 27 of the virtual workpiece 21 is extracted based on the obtained intersection lines, and the intersection of the line of sight (not illustrated) extending from each pixel of the virtual vision sensor 22 and each surface of the partial three-dimensional model 27 is determined, whereby three-dimensional point cloud data of the determined intersections can be generated as the partial three-dimensional data 28. Alternatively, the extracted partial three-dimensional model 27 itself may be generated as the partial three-dimensional data of the workpiece.

Furthermore, as a modified example of the method for generating the partial three-dimensional data, when the virtual workpiece 21 is, for example, three-dimensional edges, the intersection of each surface of the three-dimensional model of the imaging range 26 and each side of the three-dimensional edges of the virtual workpiece 21 is obtained, and a partial three-dimensional edge of the virtual workpiece 21 is extracted based on the obtained intersections, whereby the extracted partial three-dimensional edges themselves may be generated as the partial three-dimensional data.

Another modified example of the method for generating the partial three-dimensional data includes determining the intersection between the line of sight (not illustrated) extending from each pixel of the virtual vision sensor 22 and each surface of the full three-dimensional model of the virtual workpiece 21 without extracting the partial three-dimensional model or partial three-dimensional edges of the workpiece, whereby three-dimensional point cloud data of the determined intersections can be directly generated as the partial three-dimensional data 28.

As yet another modified example of the method for generating the partial three-dimensional data, when the virtual workpiece 21 is, for example, three-dimensional point cloud data, three-dimensional point cloud data which fits in the three-dimensional model of the imaging range 26 may be directly generated as the partial three-dimensional data 28 of the workpiece. When the point pitch of the three-dimensional point cloud data of the virtual workpiece 21 does not match the pitch of the line of sight extending from each pixel of the virtual vision sensor 22, it is desirable to perform processing for matching the pitch between points of the virtual workpiece 21 with the pitch between the lines of sight of the virtual vision sensor 22.

Figure 5:
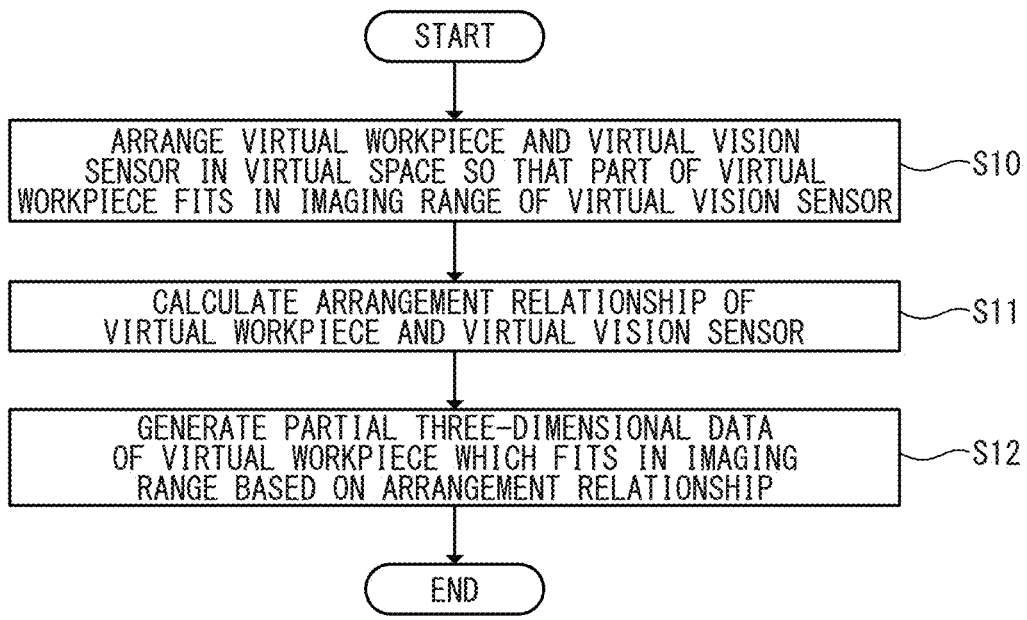
FIG. 5 is a flowchart of the three-dimensional data generation device according to the embodiment.

FIG. 5 illustrates a flowchart of the three-dimensional data generation device 1. It should be noted that the program described in accordance with this flowchart is executed by the processor of the three-dimensional data generation device 1. In step S10, three-dimensional data representing the overall shapes of the virtual workpiece 21, the virtual vision sensor 22, and the virtual robot 23, etc., are read from the memory, and the virtual workpiece 21 and the virtual vision sensor 22 are arranged in the virtual space 20 so that a part of the virtual workpiece 21 fits in the imaging range 26 of the virtual vision sensor 22. In step S11, the arrangement relationship between the arranged virtual workpiece 21 and virtual vision sensor 22 is calculated. In step S12, the partial three-dimensional data 28 of the workpiece which fits in the imaging range 26 is generated based on the calculated arrangement relationship. The method for generating the partial three-dimensional data is as described above.

Figure 6:
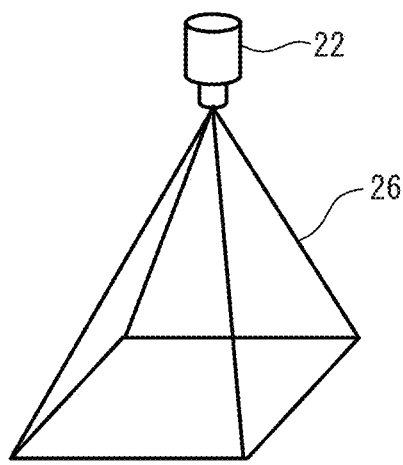
FIG. 6 is a perspective view showing an example of a preset imaging range.
Figure 7A:
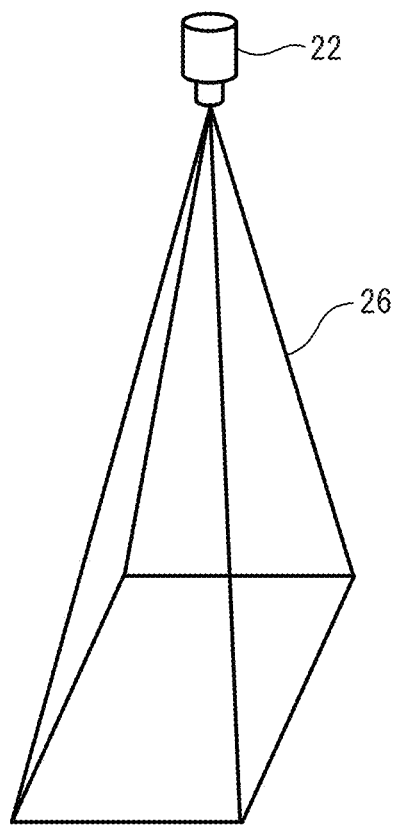
FIG. 7A is a perspective view showing an example of an imaging range which has been changed in accordance with a specification of a vision sensor.
Figure 7B:
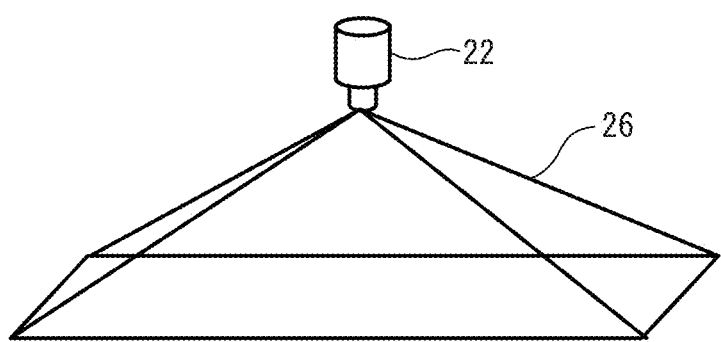
FIG. 7B is a perspective view showing an example of an imaging range which has been changed in accordance with a specification of a vision sensor.

Referring again to FIG. 1, The three-dimensional data generation device 1 may further comprise an imaging range setting section 13 and an imaging range display section 14. The imaging range setting section 13 displays a set image plane of the imaging range 26 of the virtual vision sensor 22 on a monitor, whereby the imaging range 26 can be set by a teacher. FIG. 6 shows an example of a set imaging range 26. The shape of the imaging range 26 may be changeable in accordance with the specification of the vision sensor since the shape varies depending on the type of the virtual vision sensor 22. The specification of the vision sensor includes at least one of, for example, the number of pixels of the vision sensor, the focal length (or viewing angle), and the recommended distance from the vision sensor to the workpiece. FIGS. 7A and 7B show examples of an imaging range 26 which has been changed in accordance with the specification of the vision sensor. In the example shown in FIG. 7A, the viewing angle is narrowed and the recommended distance to the workpiece is extended in accordance with the focal length of the vision sensor, whereas in the example shown in FIG. 7B, the viewing angle is widened and the recommended distance to the workpiece is shortened in accordance with the focal length of the vision sensor. The imaging range display section 14 displays the set or changed imaging range 26 on a monitor, whereby the teacher can confirm the imaging range 26.

Figure 8A:
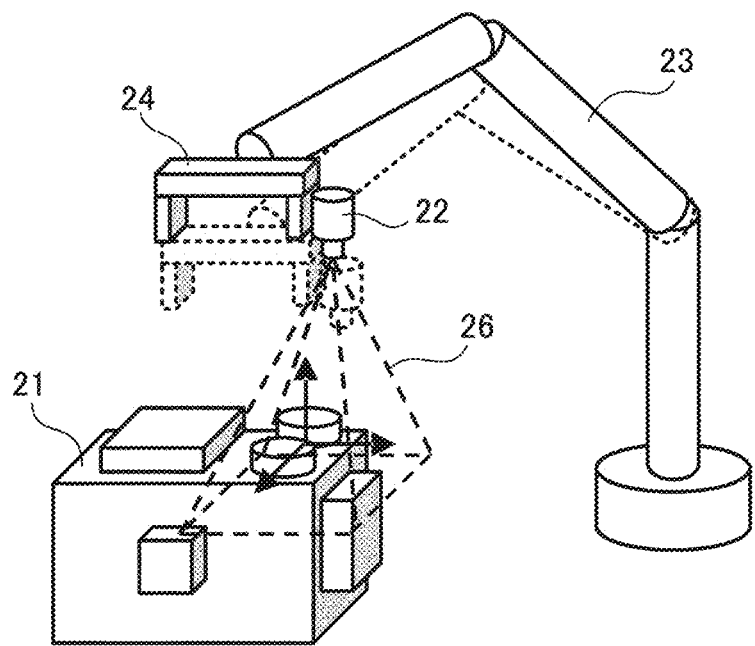
FIG. 8A is a perspective view showing an example of a robot prior to and after moving to a workpiece detection position.
Figure 8B:
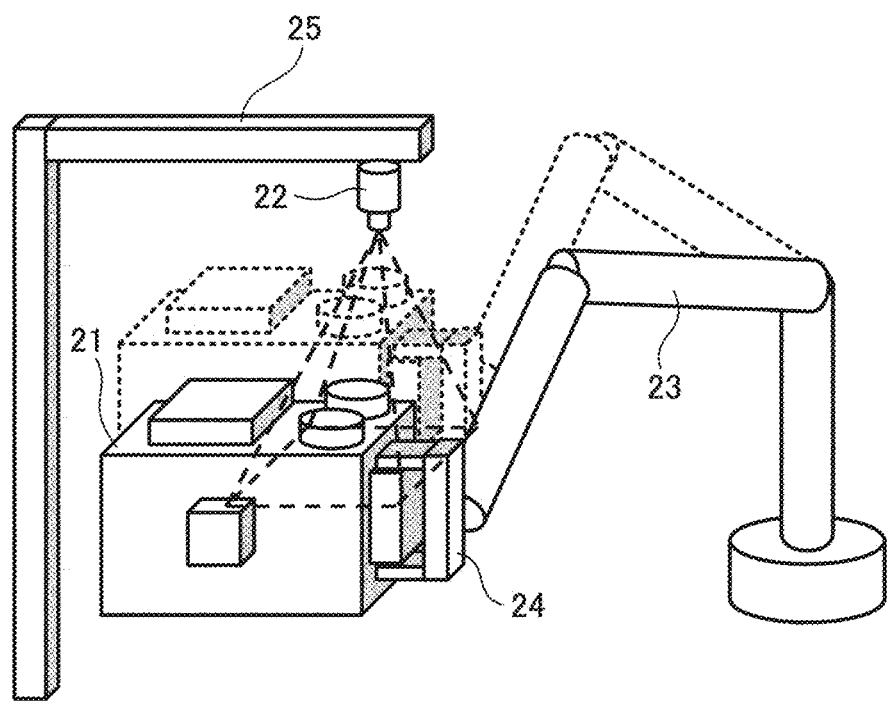
FIG. 8B is a perspective view showing an example of a robot prior to and after moving to a workpiece detection position.

Referring again to FIG. 1, the three-dimensional data generation device 1 may further comprise a movement program generation section 15. The movement program generation section 15 generates a movement program for moving the robot to a workpiece detection position by the vision sensor. FIGS. 8A and 8B show examples of a robot prior to movement (represented by the dashed lines) and after movement (represented by solid lines) to the workpiece detection position. In the example shown in FIG. 8A, the vision sensor 22 is arranged near the end effector, for example, the hand 24, of the robot 23 and the robot 23 is moved in accordance with the movement program, whereby the vision sensor 22 arranged near the hand 24 is moved to the arrangement relationship with the workpiece 21. Further, in the example shown in FIG. 8B, the vision sensor 22 is affixed in a position separate from the robot 23, for example, on the affixation structure 25, and the robot 23 is moved in accordance with the movement program, whereby the workpiece 21 gripped by the hand 24 is moved to the arrangement relationship with the vision sensor 22. According to the movement program, it is possible to carry out both workpiece detection simulation in the virtual space and workpiece detection processing with the actual device. Furthermore, if the robot 23 is moved to the arrangement relationship between the workpiece 21 and the vision sensor 22 by the movement program, the workpiece can be quickly detected from the limited imaging range 26.

Referring again to FIG. 1, the three-dimensional data generation device 1 may further comprise a data transmission section 16. The data transmission section 16 transmits at least one of the generated data, for example, the arrangement relationship described above, the partial three-dimensional data, and the movement program to the robot control device (not illustrated). The received partial three-dimensional data of the workpiece is registered in the robot control device as master data for workpiece detection. The robot control device moves the actual robot to the actual workpiece detection position detected by the actual vision sensor in accordance with the received movement program, detects the actual workpiece from the data acquired by the actual vision sensor based on the received partial three-dimensional data, and controls at least one of the position and posture of the actual robot based on at least one of the position and posture of the detected actual workpiece. Furthermore, when the data generation device 1 is integral with the robot control device, the robot control device itself may generate at least one of the aforementioned arrangement relationship, the partial three-dimensional data, and the movement program by software, i.e., offline.

According to the embodiments described above, since the master data for workpiece detection can be generated substantially automatically as compared to the case of online teaching, teacher trial and error is not required, and the man-hours for creating the master data for workpiece detection can be reduced. Furthermore, by generating the partial three-dimensional data of the workpiece which fits in the imaging range of the virtual vision sensor, when the robot is moved to the arrangement relationship between the workpiece and the vision sensor, the workpiece can be quickly detected from within the limited imaging range. Thus, there can be provided master data for workpiece detection with which high-speed matching processing can be realized.

The program executed by the processor described above may be stored on a computer-readable non-transitory storage medium such as a CD-ROM.

Though various embodiments have been described in the present description, the present invention is not limited to the embodiments described above, and it should be recognized that various modifications can be made within the scope described in the claims below.

The invention claimed is:

1. A three-dimensional data generation device, comprising:
   a virtual space arrangement section for arranging a virtual workpiece and a virtual vision sensor in a virtual space so that a part of the virtual workpiece fits in an imaging range of the virtual vision sensor,
   an arrangement relationship calculation section for calculating an arrangement relation between the arranged virtual workpiece and the virtual vision sensor, and
   a partial three-dimensional data generation section for generating partial three-dimensional data representing a partial shape of a workpiece which fits in the imaging range based on the calculated arrangement relationship.

2. The three-dimensional data generation device according to claim 1, wherein the partial three-dimensional data generation section extracts a partial three-dimensional model representing a partial shape of the workpiece which fits in the imaging range and generates the partial three-dimensional data from the partial three-dimensional model.

3. The three-dimensional data generation device according to claim 1, further comprising an imaging range setting section for setting the imaging range.

4. The three-dimensional data generation device according to claim 3, wherein the imaging range is changeable in accordance with a specification of a vision sensor.

5. The three-dimensional data generation device according to claim 4, where the specification of the vision sensor includes at least one of a number of pixels of the vision sensor, a focal length of the vision sensor, and a recommended distance from the vision sensor to a workpiece.

6. The three-dimensional data generation device according to claim 1, further comprising an imaging range display section for displaying the imaging range.

7. The three-dimensional data generation device according to claim 1, further comprising a movement program generation section for generating a movement program for moving a robot to a workpiece detection position detected by a vision sensor based on the arrangement relationship.

8. The three-dimensional data generation device according to claim 7, further comprising a data transmission section for transmitting at least one of the arrangement relationship, the partial three-dimensional data, and the movement program to a robot control device.

9. The three-dimensional data generation device according to claim 1, wherein the virtual vision sensor is installed near an end effector of a virtual robot or is affixed in a position separate from the virtual robot.

10. The three-dimensional data generation device according to claim 1, wherein the virtual vision sensor comprises a two-dimensional sensor or a three-dimensional sensor.

11. The three-dimensional data generation device according to claim 1, wherein the virtual workpiece, the virtual vision sensor, the imaging range, or the partial three-dimensional data is constituted by a three-dimensional model, three-dimensional edges, or a three-dimensional point cloud.

12. A robot control system, comprising an actual workpiece, an actual vision sensor, an actual robot, a robot control device, and a three-dimensional data generation device
   wherein the three-dimensional data generation device comprises
      a virtual space arrangement section for arranging a virtual workpiece and a virtual vision sensor in a virtual space so that a part of the virtual workpiece fits in an imaging range of the virtual vision sensor,
      an arrangement relationship calculation section for calculating an arrangement relation between the arranged virtual workpiece and the virtual vision sensor,
      a partial three-dimensional data generation section for generating partial three-dimensional data representing a partial shape of a workpiece which fits in the imaging range based on the calculated arrangement relationship, and
      a movement program generation section for generating a movement program for moving a robot to a workpiece detection position detected by a vision sensor based on the arrangement relationship,
   wherein the robot control device moves the actual robot to a detection position of the actual workpiece detected by the actual vision sensor in accordance with the movement program.

13. The robot control system according to claim 12, wherein
   the robot control device is further configured to detect the actual workpiece from data acquired by the actual vision sensor based on the partial three-dimensional data, and control at least one of a position and posture of the actual robot based on at least one of a position and posture of the detected actual workpiece.

14. The robot control system according to claim 12, wherein the three-dimensional data generation device is integral with the robot control device, and the robot control device generates at least one of the arrangement relationship, the partial three-dimensional data, and the movement program offline.

15. A three-dimensional data generation device, comprising a processor and a memory coupled to the processor,
wherein the processor is configured to:
arrange a virtual workpiece and a virtual vision sensor in a virtual space so that a part of the virtual workpiece fits in an imaging range of the virtual vision sensor,
calculate an arrangement relation between the arranged virtual workpiece and the virtual vision sensor, and
generate partial three-dimensional data representing a partial shape of a workpiece which fits in the imaging range based on the calculated arrangement relationship.

16. The three-dimensional data generation device according to claim 1,
wherein the virtual workpiece is constituted by three-dimensional edges, and the partial three-dimensional data generation section is configured to
obtain an intersection of each surface of a three-dimensional model of the imaging range and each side of the three-dimensional edges of the virtual workpiece,
extract partial three-dimensional edges of the virtual workpiece based on the obtained intersections, and
generate the extracted partial three-dimensional edges as the partial three-dimensional data.

17. The three-dimensional data generation device according to claim 1,
wherein the partial three-dimensional data generation section is configured to
determine an intersection between a line of sight extending from each of pixels of the virtual vision sensor and each surface of a full three-dimensional model of the virtual workpiece, without extracting a partial three-dimensional model representing the partial shape of the workpiece, and
generate three-dimensional point cloud data of the determined intersections as the partial three-dimensional data.

18. The three-dimensional data generation device according to claim 1,
wherein the virtual workpiece is constituted by three-dimensional point cloud data, and the partial three-dimensional data generation section is configured to
generate the three-dimensional point cloud data which fits in a three-dimensional model of the imaging range as the partial three-dimensional data of the workpiece.

19. The three-dimensional data generation device according to claim 18, wherein
a point pitch between points of the three-dimensional point cloud data of the virtual workpiece does not match a pitch between lines of sight extending from pixels of the virtual vision sensor, and
the partial three-dimensional data generation section is configured to perform processing for matching the point pitch between the points of the virtual workpiece with the pitch between the lines of sight of the virtual vision sensor.

* * * * *